No. 673,397. Patented May 7, 1901.
J. W. HORNSEY.
HOT AIR FURNACE.
(Application filed Jan. 30, 1901.)
(No Model.) 8 Sheets—Sheet 1.
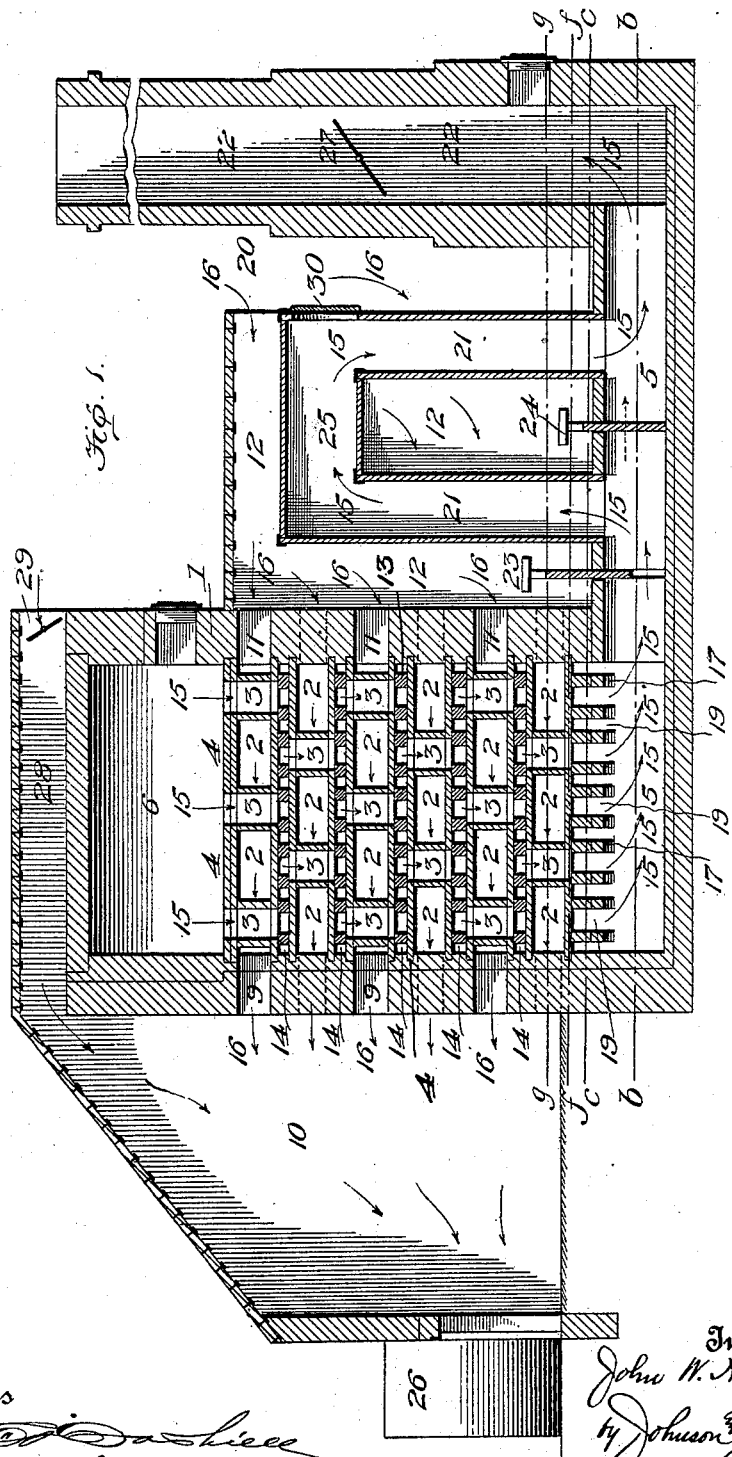

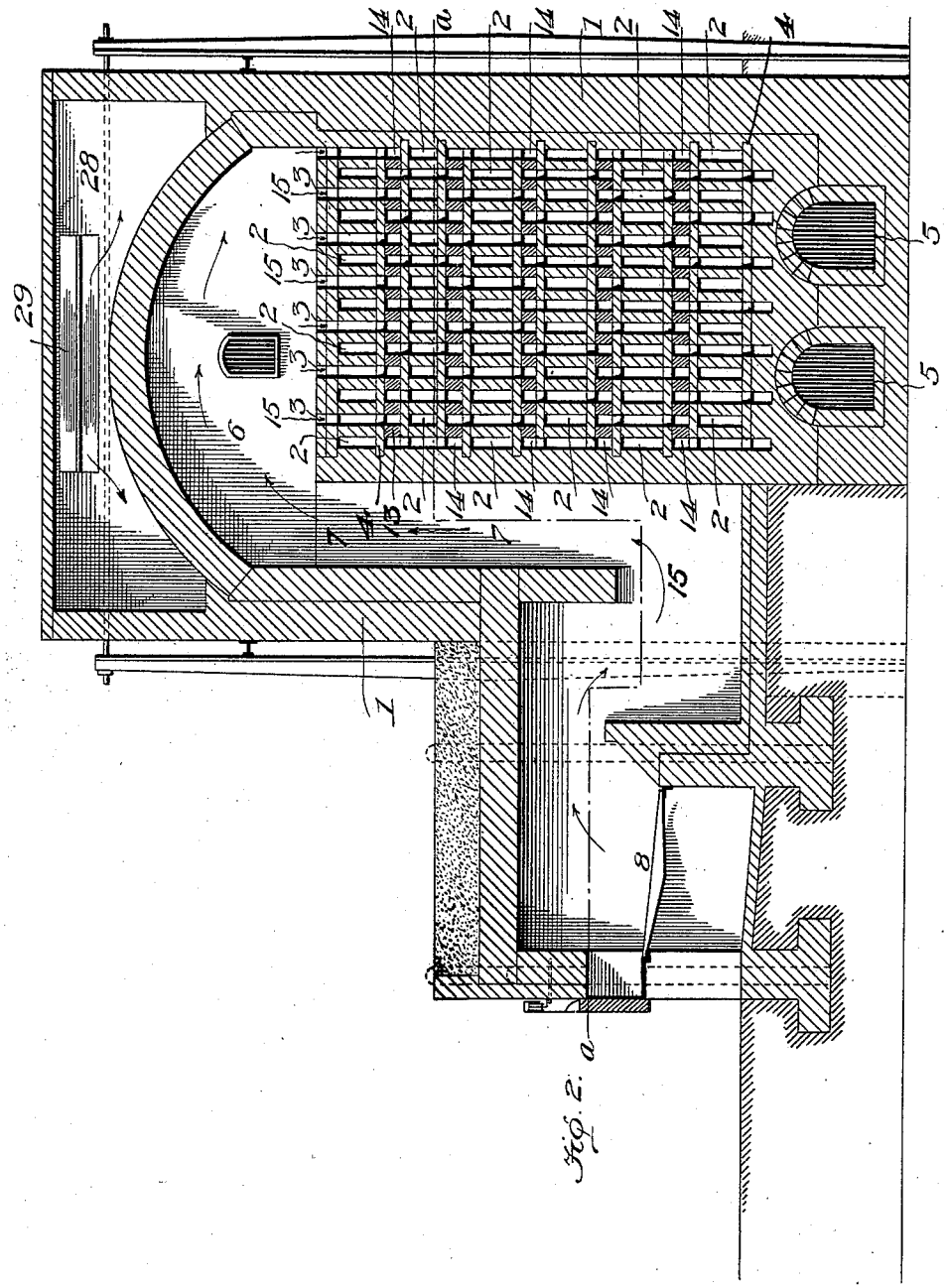

No. 673,397.  
J. W. HORNSEY.  
HOT AIR FURNACE.  
(Application filed Jan. 30, 1901.)
(No Model.)
Patented May 7, 1901.
8 Sheets—Sheet 3.
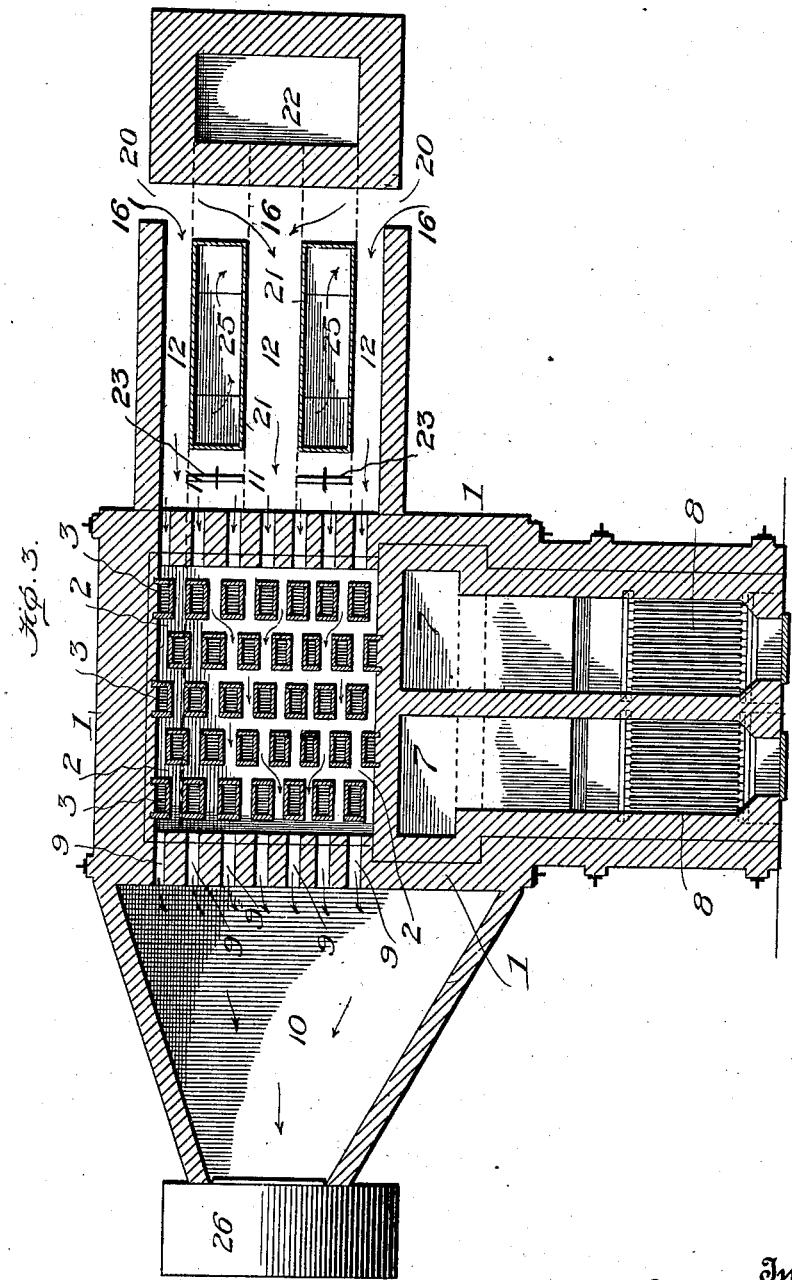

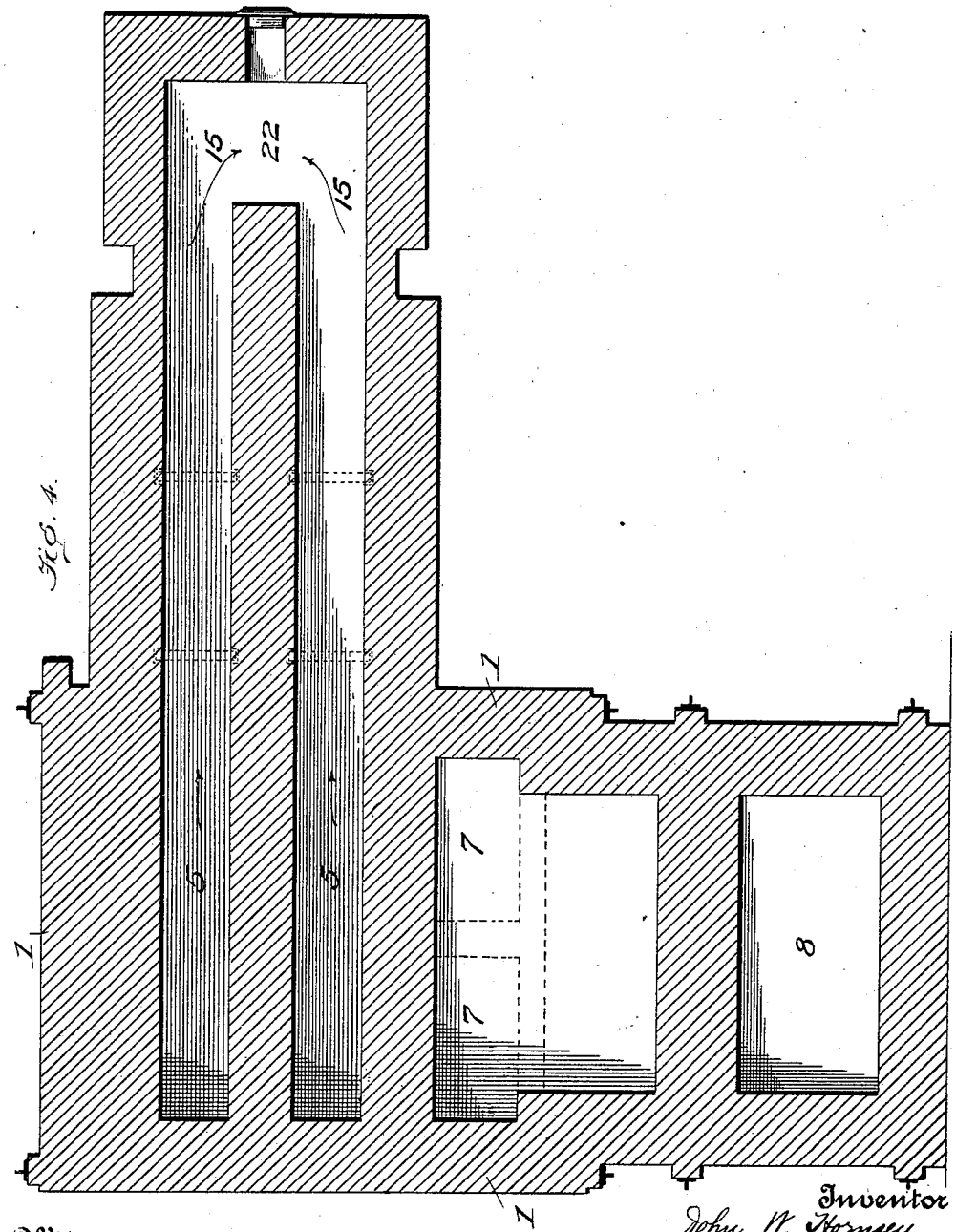

No. 673,397. Patented May 7, 1901.
J. W. HORNSEY.
HOT AIR FURNACE.
(Application filed Jan. 30, 1901.)
(No Model.) 8 Sheets—Sheet 5.
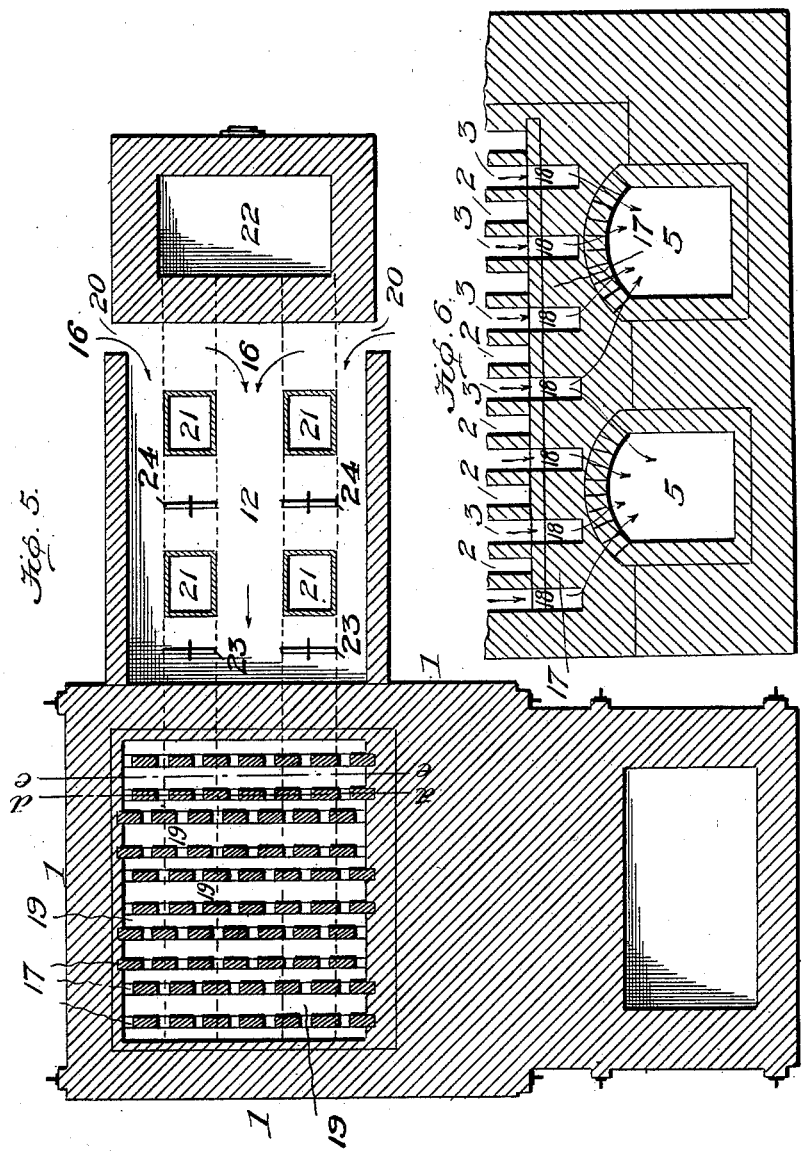

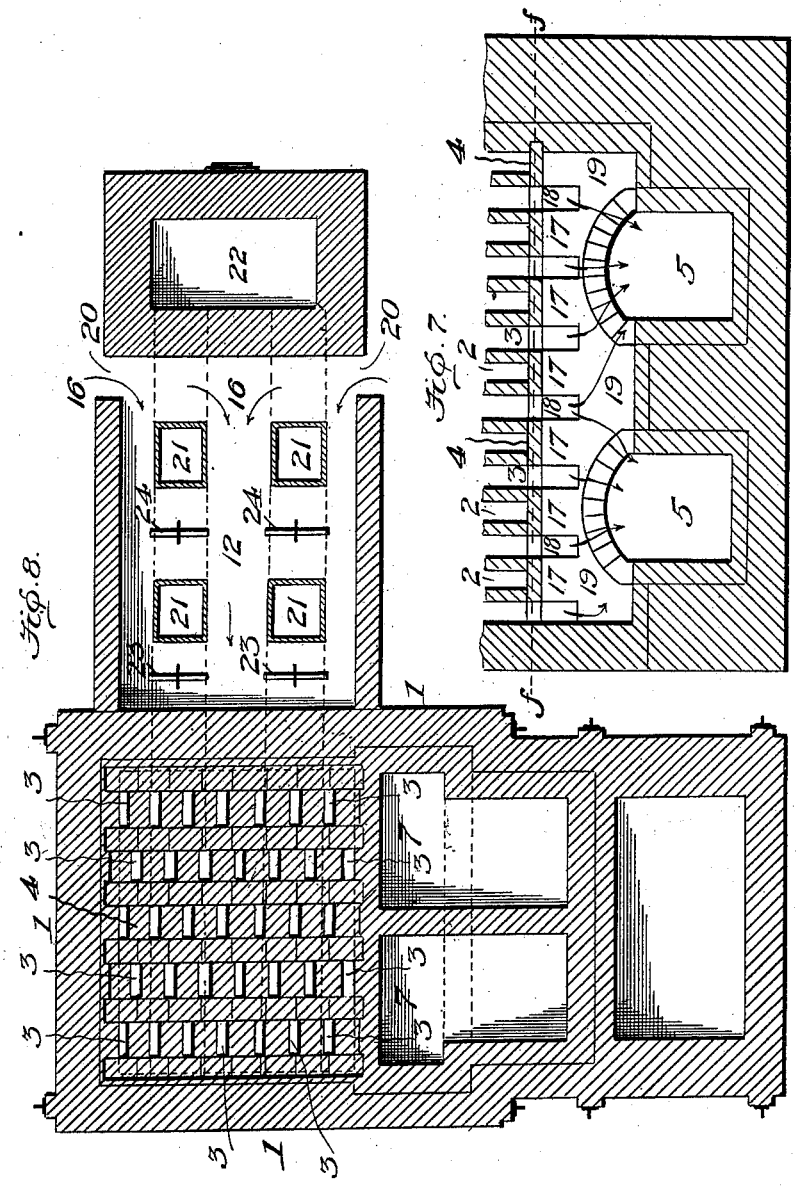

No. 673,397. Patented May 7, 1901.
J. W. HORNSEY.
HOT AIR FURNACE.
(Application filed Jan. 30, 1901.)
(No Model.) 8 Sheets—Sheet 7.
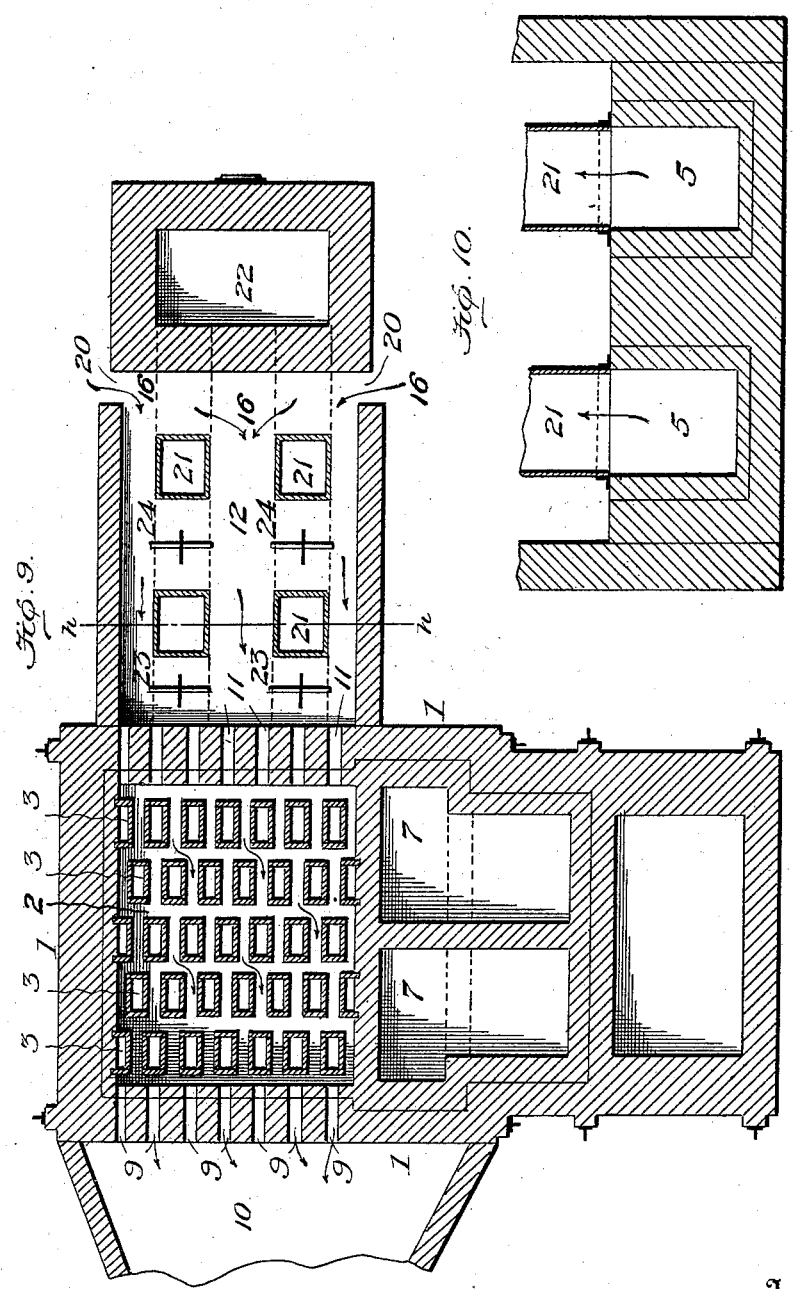

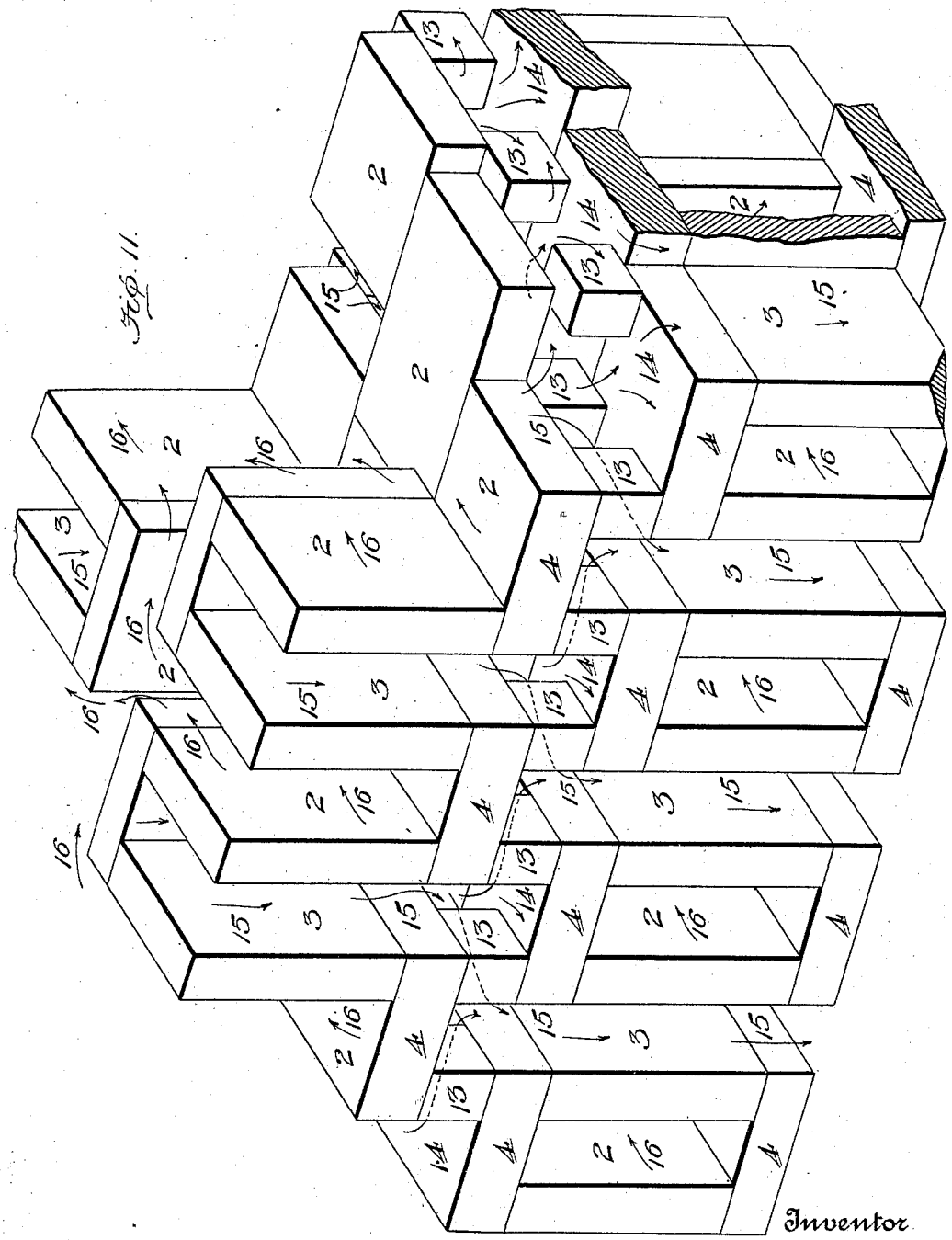

UNITED STATES PATENT OFFICE.

JOHN W. HORNSEY, OF CLEVELAND, OHIO, ASSIGNOR TO CROWN DRYER COMPANY, OF SAME PLACE.

HOT-AIR FURNACE.

SPECIFICATION forming part of Letters Patent No. 673,397, dated May 7, 1901.

Application filed January 30, 1901. Serial No. 45,347. (No model.)

*To all whom it may concern:*

Be it known that I, JOHN W. HORNSEY, a citizen of the United States, residing at Cleveland, in the county of Cuyahoga and State of Ohio, have invented certain new and useful Improvements in Hot-Air Furnaces, of which the following is a specification.

The improvement which is claimed under this patent has for one object the heating of air for drying and heating purposes to a temperature impossible solely in metallic radiators. A further object of my invention is the conversion of practically all the heat units of the fuel into pure hot air. Resulting from these objects other important advantages are obtained, and particularly an economy impossible in other systems.

The following explanation will aid in a better understanding of the objects of my invention and the manner in which it is rendered possible to use metallic radiators in combination with a furnace and a heat extractor and radiator of heat-resisting material interposed between the furnace and the metallic radiator for the heating of air in thin volumes to a high temperature and in which the products of combustion have a temperature impossible of use in direct contact with metallic walls. The same amount of fuel consumed at a temperature of, say, 1,000° Fahrenheit would, if consumed in a temperature of 2,500° Fahrenheit, heat the same or even a considerably larger volume of the gases of combustion to this temperature of 2,500° as would be required in the case above stated to heat this same volume to 1,000°. By the interposition of a heat extractor and radiator built of fire-resisting material between the furnace and a metallic radiator I extract the heat from the fire-resisting structure and make use of it, so as to reduce the temperature of the products of combustion passing through it from, say, 2,500° to about 1,000°, after which the fire products at the last-named temperature are caused to pass through a metallic radiator. From this process it will be seen that the heat extracted from the products of combustion while passing through the fire-brick radiator and being reduced from 2,500° to 1,000° is a clear gain as compared with other systems, for the reason that no more coal is required to obtain the higher temperature, and after this heat of 1,500° has been extracted there remains the same volume of gases and at the same temperature from which to extract the same amount of heat as in radiators of solely metallic systems.

The high temperature requisite for perfect combustion is used to effect the saving of from fifty to seventy-five per cent. of fuel. In obtaining this result I employ in a single structure a heat extractor and radiator having a capacity of high temperature but of low radiating capacity and a separate and independent radiator having a low temperature but a high radiating capacity, whereby the products from the furnace pass into and through the radiator of low radiating capacity at a temperature of 2,500° and are caused to give up, say, 1,500° by radiation to air passing into and through such radiator, while the remaining 1,000° of heat are utilized in the radiator of high radiating capacity to heat the air in its passage to the radiator of low radiating capacity. In this way my invention effects a complete combustion of the fire products by providing for a temperature required to effect such combustion, and after extracting, say, 1,500° from this perfect combustion in heating thin volumes of air there will still remain of this perfect combustion as much heat passing from the low to the high radiator as can be obtained by other systems.

The following description, read in connection with the accompanying drawings, will enable any one skilled in the art to which my invention relates to understand its nature and to practice it in the form in which I prefer to employ it; but it will be understood that my invention is not limited to the precise form and construction herein illustrated and described, as various modifications and changes may be made without exceeding the scope of the claims in which my invention is set out.

Referring to the drawings, Figure 1 represents in vertical section my improved hot-air furnace. Fig. 2 is a transverse section of the same. Fig. 3 is a horizontal section on the line $a$ $a$ of Fig. 2, showing the communication of the air-flues of the fire-resisting radiator with the hot-air-delivering and the air-storage chambers, a pair of metallic radiators being shown in the air-storage chamber. Fig. 4 is a horizontal section on the line *b b* of Fig. 1, showing a pair of base-flues and their termination in the draft-stack. Fig. 5 is a horizontal section on the line *c c* of Fig. 1, showing the transverse walls, the cross-openings therein, and the fire-flue passages formed thereby which open directly into the base-flues, which are shown in dotted lines and across which the said walls are built. Fig. 6 is a section through the flue-wall on the line *d d* of Fig. 5, showing one of the transverse walls and the cross-openings therein seen in Fig. 5, by which the fire-flues between said walls communicate with each other. Fig. 7 is a like section on the line *e e* of Fig. 5, showing one of the transverse fire-flues 19 opening into the base-flues and the vertical fire-flues opening into the said transverse flue. Fig. 8 is a horizontal section on the line *f f* of Figs. 1 and 7, showing in section the slab floor which covers the transverse fire-flues which open into the base-flues and also the floor-openings for the vertical fire-flues. Fig. 9 is a horizontal section on the line *g g* of Fig. 1, showing one of the air-spaces between the floor-slabs opening at the opposite walls of the fire-resisting radiator and the vertical fire-flues passing through openings in the floor-slabs. Fig. 10 is a transverse section on the line *h h* of Fig. 9, showing the connection of the pair of metallic radiators with the pair of base-flues. Fig. 11 shows a group of built-up slabs and blocks to illustrate the manner of forming the air-spaces and the fire-flues of the fire-resisting, heat-extracting, and heat-radiating structure which I prefer to use and the direction of the air and fire through the structure.

The flue structure is of fire-resisting material and in tiers of passages, in which the air is heated in comparatively thin volumes. It is interposed between the furnace and a separate and distinct metallic radiator, whereby I am enabled to use the products of combustion at a temperature of, say, 2,500° from a radiator of low capacity for heating air in connection with a radiator wherein it would be impossible to use such high temperature. This flue structure is built up of fire-brick or slabs within a closure of thick walls 1, so as to form vertical fire-flues and horizontal air-spaces 2, through which the walls of the vertical fire-flues 3 pass in staggered relation between the floors 4, forming the air-spaces. The fire-flues are built up of fire-brick walls upon the arches of base-flues 5, into which they open, while at the top of the radiator the fire-flues open into a heat-diffusion chamber 6, which by a vertical flue 7 between the closure-wall and the radiator communicates with the furnace 8, as in Fig. 2. The air-spaces 2 are formed by the horizontal slab floors 4, arranged in tiers, the spaces between each tier extending through the structure and open by flue-openings 9 at the vertical closure-wall into a hot-air chamber 10 and by flue-openings 11 into an air-storage chamber 12. The slab floors are supported upon blocks 13, set at the corners of the vertical fire-flues, whereby shallow fire-flues 14 are formed between the slab floors 4 alternately with the air-spaces 2 and into which shallow flues the vertical fire-flues 3 open, Figs. 1 and 2, whereby the fire products are caused to pass successively from the vertical fire-flues into the shallow flues and be diffused therein between the floor-walls of the air-spaces, into which they give up heat by radiation, while the walls of the vertical fire-flues also give up heat by radiation into the air-spaces 2, so that the air entering the latter from the storage-chamber 12 passes in contact with walls forming the flues through which the products of combustion pass at a temperature of, say, 2,500° and passes therefrom into the hot-air-delivering chamber 10, having absorbed in such passage about 1,500° of such temperature. Still remaining in this flue structure is a temperature of, say, 1,000°, and this I utilize for heating the air before it enters the flue structure, so that the air is caused to pass therefrom at a temperature which it is impracticable to obtain from any metallic radiating system. In this construction I prefer to have the vertical depth of the fire-flues 3 and the air-spaces 2, Fig. 1, about equal; but the horizontal fire-flues 14 may be of considerably less depth the better to hold and diffuse the heat products in contact with the slab floors which form the top and bottom of the air-spaces. This construction of supporting the slab floors and forming the fire-flues is best seen in Fig. 11, wherein the air-spaces and the fire-flues are formed by the same walls, the arrows 15 showing the course of the fire products and the arrows 16 the course of the air, which in its passage absorbs the heat from the flue-walls. The fire products pass from the furnace into the heat-diffusion chamber 6, thence through all the descending fire-flues 3, and around and between the walls which form the air-spaces into a base-flue, which extends from the wall at which the hot air is delivered from the flue structure to the draft-stack, as in Fig. 1.

The heat-diffusion chamber is arched over the top of the flue structure or otherwise suitably formed, and therein concentrates the greatest heat from the furnace, so that the draft-stack has direct communication with the furnace through this heat-diffusion chamber and the flue structure. The base-flues have sufficient capacity to insure the proper draft through the flue structure, and in this respect the fire-flues entering the base-flues are adapted to give free outlet. This construction is best seen in Figs. 1, 5, 6, and 7, wherein are shown the first tier of fire-flues, which open into the base-flues. Upon the arches of the base-flues are built the parallel transverse walls 17, which form piers by being intersected with openings 18, which open into the fire-flues 19, formed between these transverse walls, and into the base-flues, making the exit of the fire products free from the flue structure. On these piers is laid the bottom slab floor, and the latter is laid in successive tiers upon the blocks 13 and on the tops of the vertical fire-flue walls.

Referring to the communication between the fire-flues and the base-flues, the construction by which such communication is effected provides, besides a full and free communication for the passage of the fire products from the flue structure, a firm foundation upon which to erect the structure, a uniform draft from all the fire-flues, and affords a convenient means for cleaning the foundation-flues, to which access is afforded through the base-flues. Especially is this construction important by reason of the unobstructed space afforded by the crossing of the base-flues by all the transverse flues 19, as seen in Fig. 7.

The air enters the hot walled spaces from the chamber 12, which incloses all the inlet wall-openings and which is preferably open at one side 20, Figs. 1 and 3, some distance from the flue-wall, so as to form the storage-chamber to allow an equal and uniform volume of air to pass into all the air-heating spaces. This air-storage chamber forms the housing for one or more metallic radiators 21, which may be of any suitable construction, but which I prefer to mount directly upon the base-flues and to use in the form of an inverted U, their ends opening into the base-flues, so that the products of combustion leaving the fire-resisting radiator—say at 1,000° temperature—are caused to pass from the base-flue into and through these metallic radiators and from thence back into the base-flues to the draft-stack 22, whereby the air in the storage-chamber 12 is caused to pass over and around the walls of the metallic radiator and absorb therefrom heat not radiated from the fire-resisting flue structure to heat the air before it enters the latter. For regulating the draft through the metallic radiator or for diverting the draft therefrom directly to the draft-stack a pair of valves 23 and 24 is provided in the base-flue, one, 23, located between the fire-resisting and the metal radiators and the other, 24, between the open ends of the metallic radiator.

By opening the valve 23 more or less and closing the valve 24 the volume and the temperature of fire products passing into the metallic radiator can be regulated as may be found necessary to suit the conditions under which the furnace may be used.

By opening the valve between the open ends of the metallic radiator the fire products will be diverted from the metallic radiator and caused to pass directly to the draft-stack. It will be noted that the products of combustion in passing through the metallic radiator are in an upward-and-downward course and that the upper or over passage 25 therein is of greater area than the vertical passages, thereby supplying a larger radiating-surface at the point at which the products of combustion are partially retarded in their passage by reason of the natural tendency of the heat units to ascend with greater freedom than to descend.

The provision of the pair of base-flues and their relation to the fire-resisting structure are important to cause a uniform diffusion of the fire products through the fire-flues.

Since all of the fire-flues are in direct communication with each other and with the furnace, the tendency of the fire products would be to seek the most direct course in entering the flues, and therefore a greater proportion of the fire products might be drawn into those flues of the structure nearest the communication with the furnace. This would result in the unequal heating of the fire-flue walls and the consequent unequal heating of the air in its passage through the structure. To overcome this unequal distribution of the fire products in their passage through the flue structure, the draft through the base-flues is controlled by a valve in each base-flue, located between the flue structure and the source of the draft, so that the valve in one base-flue may be adjusted to give a different area in one base-flue from that of the other, and this difference of flue area would result in an equal distribution of the draft throughout the flue structure, with the consequent uniform diffusion of the fire products throughout said structure, and in this manner the temperature of the air in its passage through the structure is rendered uniform at all parts of the air-passage of each tier. By these valves one of the base-flues may be entirely cut off, if desired, and it will be noted that as these base-flues are parallel to each other in the same horizontal plane and have identical communication with the fire-flues the cutting off of one will not affect in any way the function of the other, since the draft through all the fire-flues can be entirely directed into either of the base-flues.

It is also important to note that the combined area of the air-heating storage-chamber 12 around the walls of the metallic radiator is greater than the combined area of the wall-openings 11, through which the air passes from the storage-chamber into the air-heating spaces of the fire-resisting radiator. It is this construction which gives the storage capacity to the air-inlet chamber, because the passage of the air therefrom is somewhat retarded, and consequently is caused the better to absorb the heat from the metallic radiator, so that the hot air from this storage-chamber will avoid the danger of cracking the walls of the fire-resisting radiator. Another feature of the two radiators, one of low radiating capacity and the other of high radiating capacity, is that the walls of the upper tiers of the air-spaces being the hottest are more susceptible to injury from the admission of air at a low temperature; but the admission of air from the storage-chamber being relatively of the same proportionate temperature from its top to the bottom renders injury to the walls of the fire-brick reduced to a minimum. In Fig. 1 is seen a housing 26 for a suction-fan draft at the outlet of the hot-air-supply chamber, whereby the air is drawn through the fire-resisting radiator from the air-storage chamber; but obviously an air-draft stack may be used.

The draft-stack of the base-flues is controlled by a damper 27, so as to regulate the force of the draft of the heat products through the fire-flues of the fire-brick structure. Obviously an exhaust-fan or other means for production of this draft may be employed.

To save the heat radiated through the crown or arch of the heat-diffusion chamber, and if desired to reduce the temperature of the air delivered from the hot-air-supply chamber 10, I provide a flue 28 over the crown of the diffusion-chamber, so that cold air entering this flue at a valve-controlled opening 29 on the closure-wall of the flue structure over and outside of the closure for the air-storage chamber is heated and delivered into the hot-air chamber above the air-spaces of the flue structure. This crown-chamber is also heated from the heat from the body of the flue structure, so that the temperature of the air delivered from the flue structure may be regulated from the chamber of the metallic radiators and from the flue over the heat-diffusion chamber, giving thereby a control of the temperature suited for drying or for heating.

In some instances an absolutely uniform temperature is essential, and in such cases provision may be made for adjusting the valve 29 automatically, and for which a thermostat or other suitable means may be used.

In Fig. 3 two furnaces are provided side by side, both communicating with the heat-diffusion chamber by separate flues 7 7; but obviously one or more furnaces may be used, as may be deemed advisable. In like manner one or more base-flues may be used with metallic radiators 12, which are set in the air-storage chamber, one in independent communication with each base-flue.

If desired, provision may be made for regulating the area of the air-inlet openings 11 of the fire-brick radiator to regulate the volume of air passing through it. Provision may be also made whereby access may be had for cleaning all the fire-flues and other parts of furnace. Provision may also be made for access to clean the upper part of the metallic radiator at 30 in Fig. 1.

I have shown and described a fire-resisting flue structure as constructed with tiers of horizontal air-spaces and vertical fire-flues; but it is obvious that the number of tiers may vary from one to any desired number, as conditions may require, and without changing the functions and relations of the coacting parts in the storing, heating, and delivering of the air or the results derived from the extraction by radiation of the heat from the products of combustion in their passage through the high and low temperature radiators.

Now looking at my present invention in its broad conception the following will show a result which is of primary importance in my invention.

In the absorption of water from the material in the operation of drying it is well known that the capacity of air for the absorption of water increases approximately four times as rapidly as the temperature—as, for instance, an increase of, say, fifty per cent. in the temperature of the air as the drying medium will accomplish the result of increasing the absorption capacity about two hundred per cent. Therefore, inasmuch as with my present invention I am enabled to produce hightly-heated air beyond the temperature of other systems, it is, as a concomitant result, possible for me to produce air with a very largely increased capacity for the absorption of water, whereby the same volume of air is capable of performing much more work than is possible with other systems and in which the material to be dried will withstand without injury this high temperature. Now applying these well-known principles to my present invention it will be seen that the provision of regulating the temperature of the air in the hot-air-supply chamber and the provision whereby the fire-draft is regulated become important factors in adapting the temperature of the air as regards its capacity to absorb water to the material to be dried. In this coöperating regulation of the temperature of the air and of the fire-draft the two regulating devices coact—that is, the valve controlling the cold-air flue and the valve controlling the base draft-flue. In this coöperation by adjusting the valve of the cold-air flue as may be desired the temperature of the air at the point of delivery is increased or diminished, and by adjusting or partially closing the valve 23 in the base draft-flue the fire products are caused to be retarded in their passage through the flue structure, thereby materially increasing their temperature in the flue structure, with a consequent increase in the temperature of the walls of the air-spaces, and consequently increasing the temperature of the air in its passage through these spaces to the point of delivery.

The location of the cold-air flue above the flue structure is important, because the temperature of air at the point of delivery from this cold-air flue into the hot-air-supply chamber being considerably less than that of the hot air at the point of delivery from the air-passages of the flue structure the tendency of the air issuing from the hot-air passages into the supply-chamber is therefore upward, while that of the air passing from the cold-air flue into the hot-air-supply chamber is downward. These opposite directions of air courses at different temperatures effects a complete commingling of the air in this chamber, so that it is delivered continuously therefrom at a uniform temperature.

In starting the fire the metallic radiator may be cut out of the draft and the air-inlet openings of the flue structure may be closed in any manner until the flue structure shall have obtained a working heat.

I do not in the Letters Patent to be issued on this application claim the herein-described process for heating air, nor for treating the products of combustion in the heating of air, nor the processes herein described in which the heating of air and the treatment of the products of combustion are employed and regulated to regulate the temperature of the air at the point of delivery, as such processes constitute the subject-matter of claim in an application filed by me of even date herewith for an improvement in the process of heating air.

I claim—

1. In an air-heating furnace and in combination, a flue structure of fire-resisting material, forming an air space or spaces and fire-flues, an air-storage chamber and a hot-air-supply chamber on opposite sides of said flue structure, both chambers having communication with said air-flue space and inclosing the opposite ends of said spaces, a furnace having communication with the fire-flues, and a metallic radiator located in the air-storage chamber, the fire-resisting flue structure being interposed between the furnace and the metallic radiator, a base draft-flue having communication with the fire-flues and with the metallic radiator, and a draft-stack.

2. In an air-heating furnace and in combination, a flue structure of fire-resisting material forming tiers of air-spaces and fire-flues, an air-storage chamber and a hot-air-supply chamber on opposite sides of said flue structure, both chambers having communication with said air-spaces, and inclosing the opposite ends of said spaces, a furnace and a heat-diffusion chamber in communication with the latter and with the inlet-openings of the fire-flues, a cold-air flue above the heat-diffusion chamber, opening at one end into the hot-air-supply chamber and at its other end to the outer air by a valve-controlled inlet, a base draft-flue in communication with the fire-flues and a draft-stack for the purpose stated.

3. In an air-heating furnace and in combination, a flue structure of fire-resisting walls forming tiers of air-spaces and fire-flues, an air-storage chamber and a hot-air-supply chamber on opposite sides of said flue structure, both chambers having communication with said air-spaces and inclosing the opposite ends of said spaces, a furnace having communication with the fire-flues, and a metallic radiator located in the air-storage chamber, the flue structure being interposed between the furnace and the metallic radiator, a base draft-flue having communication with all the fire-flues and by openings with the metallic radiator, a draft-stack, and a pair of valves located in the base-flue one between the fire-brick flue structure and the metallic radiator and the other between the openings which open from the metallic radiator into the base-flue for the purpose stated.

4. In an air-heating furnace and in combination, a flue structure of fire-resisting walls forming tiers of air-spaces and fire-flues, an air-storage chamber and a hot-air-supply chamber on opposite sides of said flue structure, both chambers having communication with said air-spaces and inclosing the opposite ends of said spaces, a furnace having communication with the fire-flues at the top of the flue structure, a base draft-flue having communication with all the fire-flues, a metallic radiator upon the base-flue in the air-storage chamber, and communicating by openings with the base-flue and having its over top part of larger area than its base-flue openings, a draft-regulating valve in the base-flue between the flue structure and metallic radiator, means for cutting out the metallic radiator from the draft-passage, and a draft-stack.

5. In an air-heating furnace and in combination, a flue structure of fire-resisting walls forming tiers of air-spaces open at their opposite ends in the closure-walls, and fire-flues, an air-storage chamber and a hot-air-supply chamber on opposite sides of said flue structure inclosing all the inlet and outlet openings of said air-spaces, a furnace having communication with the fire-flues at the top of the flue structure, a base draft-flue having communication with all the fire-flues, a metallic radiator upon the base-flue in the air-storage chamber and communicating by openings with the base-flue, the total area of the air-heating chamber around the walls of the metallic radiator being greater than the total area of the wall-openings of the air-spaces, a draft-stack, and means whereby the draft is regulated in the base-flue.

6. In an air-heating furnace and in combination, a flue structure of fire-resisting material constructed with walls forming fire-flues and air-spaces heated by the fire-flue walls, a heat-diffusion chamber above the flue structure and in communication with the fire-flues thereof, a hot-air-supply chamber in communication with the air-spaces in the flue structure, a valve-controlled cold-air flue supplementing the heat-diffusion chamber, and opening into the hot-air-supply chamber, and a furnace in communication with the heat-diffusion chamber.

7. In an air-heating furnace and in combination, a flue structure of fire-resisting material constructed to form fire-flues and tiers of air-spaces heated by the fire-flue walls, a hot-air-supply chamber on one side of the flue structure, a valve-controlled cold-air flue, the flue-structure air-spaces and the cold-air flue opening into the hot-air-supply chamber at one and the same side wall of the flue structure, and the air-spaces and the cold-air flue opening at the other side wall of the flue structure, and a furnace in communication with the fire-flues.

8. In an air-heating furnace and in combination, a flue structure of fire-resisting material constructed to form fire-flues and tiers of air-spaces heated by the fire-flue walls, a furnace in communication with the fire-flues, a pair of horizontal base draft-flues each having communication with the fire-flues, a source of draft, and a valve controlling each base-flue, whereby a uniform diffusion of the fire products is obtained through the flue structure.

9. In an air-heating furnace and in combination, a flue structure of fire-resisting material constructed to form fire-flues and tiers of air-spaces heated by the fire-flue walls, a furnace in communication with the entrance of all the fire-flues, a pair of base draft-flues each having identical communication with the fire-flues and with the source of draft, and a valve in each base-flue between the flue structure and the source of draft whereby the draft area of one of said base-flues may be regulated for effecting an equal distribution of the draft through the flue structure, or to cut it off without affecting the function of the other base-flue.

10. In an air-heating furnace and in combination, a flue structure of fire-resisting material forming tiers of air-passages opening at the opposite side walls, and fire-flues, an air-storage chamber and a hot-air-supply chamber on opposite sides of said flue structure inclosing all the inlet and outlet openings of said air-spaces, a furnace having communication with the fire-flues at the top of the flue structure, a valve-controlled cold-air flue above the inlet ends of the fire-flues, a metallic radiator in the air-storage chamber, means whereby it is caused to have communication with the outlet ends of the fire-flues, and means whereby such communication is controlled, as a means for controlling the temperature of the air delivered from the hot-air chamber.

11. In an air-heating furnace and in combination, a flue structure of fire-resisting material forming tiers of air-spaces opening at the opposite side walls, and fire-flues, an air-storage chamber and a hot-air-supply chamber on opposite sides of said flue structure inclosing all the inlet and the outlet openings of said air-spaces, a furnace having communication with the fire-flues at the top of the flue structure, a metallic radiator in the air-storage chamber and means whereby said metallic radiator is caused to have communication with the outlet ends of the fire-flues, the admission of air from the storage-chamber into the said air-flues being relatively of the same proportionate temperature from the top to the bottom tiers of said air-spaces to prevent injury to the flue-structure walls at which the products of combustion enter at their highest temperature.

12. In an air-heating furnace and in combination, a flue structure of fire-resisting material forming tiers of air-spaces opening at the opposite structure walls, and fire-flues, a hot-air-supply chamber inclosing all the outlet-openings of said air-spaces, a furnace having communication with the fire-flues, a base-flue having communication with all the fire-flues, a metallic radiator upon the base-flue and communicating by openings with the base-flue, and means whereby the draft may be directed through said radiator.

13. In an air-heating furnace and in combination, a flue structure of fire-resisting walls forming tiers of air-spaces and fire-flues, a furnace in communication with said fire-flues, a pair of base draft-flues, a multiple of transverse walls forming flues each crossing and opening into the base-flues and into which all the fire-flues open, the said transverse walls being built up in piers 17 forming cross-openings 18 which connect the flue-spaces 19 on each side of said transverse walls, whereby a full and free communication for the fire products is established between the fire-flues and the base-flues.

14. In an air-heating furnace and in combination, a flue structure of fire-resisting walls constructed to form tiers of air-spaces and fire-flues, a furnace in communication with said fire-flues, a multiple of transverse walls 17 forming flues 19 each crossing the base-flues and into all of which transverse flues the fire-flues open, and a draft-stack, the said transverse flues extending between the structure-walls and the said base-flues opening their full width into the transverse flues and meeting in their full area into the draft-stack.

15. In an air-heating furnace and in combination, a flue structure of fire-resisting walls forming tiers of air-spaces and fire-flues, a hot-air-supply chamber inclosing the outlet-openings of the air-spaces, a furnace in communication with the inlet-openings of the fire-flues, a cold-air flue above the flue structure opening into the hot-air-supply chamber and to the outer air by a valve-controlled inlet, a base draft-flue in communication with the fire-flues, and a valve in the base-flue for regulating the draft, whereby the temperature of the air is regulated at the point of delivery on one side of the flue structure and the fire-draft is regulated at its other side with the consequent result that by the coacting functions of these valved passages control is had over the temperature of the air at the point of delivery, while control is had over the temperature of the heat products by retarding the flow of the products of combustion in their passage through the flue structure and thereby coöperate in determining the temperature of the air at the point of delivery.

16. In an air-heating furnace and in combination, a flue structure of fire-resisting material constructed to form fire-flues and tiers of air-spaces heated by the fire-flues, a furnace in communication with the fire-flues, a pair of horizontal base draft-flues each having communication with the fire-flues, a pair of metallic radiators in separate communication with the base draft-flues, a pair of valves arranged in each base draft-flue whereby to control the communication of the latter and of the metallic radiator with the fire-flues, a source of draft, whereby a uniform diffusion of the fire products is obtained through the flue structure in the use of one or both of the base draft-flues.

17. In an air-heating furnace and in combination, a flue structure of fire-resisting walls constructed to form fire-flues and tiers of air-spaces heated by the fire-flues, a furnace in communication with the fire-flues, a pair of horizontal base-flues having identical communication with the fire-flues and with the source of draft, a pair of metallic radiators having identical separate communication with the base-flues, a pair of valves having identical arrangement in each base-flue and relation to its metallic radiator, whereby the cutting out of one flue from the draft will not affect the function of the other.

18. In an air-heating furnace and in combination, a flue structure of fire-resisting walls constructed to form fire-flues and tiers of air-passages heated by the fire-flues, a furnace in communication with the fire-flues, a base-flue having communication with said flues and the source of draft, a heat-diffusion chamber above the flue structure having communication with the furnace, a cold-air flue above the heat-diffusion chamber and a hot-air-supply chamber into which the tiers of air-passages and the cold-air flue open, and a source of suction-draft for the hot-air chamber, whereby to effect the commingling of air volumes of different temperatures in the way and for the purpose stated.

In testimony whereof I affix my signature in presence of two witnesses.

JOHN W. HORNSEY.

Witnesses:
A. ROLAND JOHNSON,
GUY H. JOHNSON.